United States Patent Office 2,777,805
Patented Jan. 15, 1957

2,777,805

REACTIONS CATALYZED BY PLATINUM OR PALLADIUM CATALYSTS

Philip Andrew Lefrancois, Jersey City, Earl W. Riblett, Tenafly, and William P. Burton, Little Silver, N. J., assignors to The M. W. Kellogg Company, Jersey City, N. J., a corporation of Delaware No Drawing. Application January 30, 1952,
Serial No. 269,114

12 Claims. (Cl. 196—50)

This invention relates to novel reactions which are catalyzed by means of metallic platinum or palladium distributed on a carrier material. More particularly, this invention pertains to a novel catalytic process for converting hydrocarbons.

It is an object of this invention to provide reactions which are catalyzed by a platinum- and/or palladium-containing catalyst.

Another object of this invention is to provide an improved process for the conversion of hydrocarbons.

Still another object of this invention is to provide an improved process for the reforming of hydrocarbon oils.

A further object of this invention is to provide an improved process for the reforming of petroleum naphthas.

Other objects and advantages of this invention will become apparent from the following description and explanation thereof.

In accordance with the present invention, improvements in catalyzed reactions are accomplished by the employment of a catalyst comprising a residue of platinum and/or palladium on about 0.5 to about 15% by weight of silica and a carrier material other than silica.

The catalysts employed in the present invention possess numerous outstanding advantages and have a wide field of utility. In general, it appears that these contact materials are suitable for any reactions which are susceptible to catalysis with platinum or palladium. These are useful in a variety of hydrocarbon conversion reactions, particularly those in which the hydrogen-carbon ratio is altered. Among the numerous reactions which lend themselves to catalysis by contact materials of the type disclosed herein are dehydrogenation, hydrogenation, hydrogenolysis, cracking, hydrocracking (i. e., cracking under hydrogen pressure), isomerization, oxidation, aromatization, cyclization, hydrodesulfurization, hydrocarbon synthesis, dealkylation, hydrodechlorination, dehydroxylation, alkylation, polymerization and hydrogen exchange systems. In general, these reactions may be carried out under the conventional reaction conditions of temperature, pressure, etc., with the catalysts described herein. However, in many instances, the activity of the contact materials permits the employment of less severe conditions, especially lower temperatures and contact times, without any sacrifice in yield. A wide variety of organic compounds may be dehydrogenated including naphthenes, paraffins, alkyl radicals in aralkyl compounds, butenes, sterols, glycerides, and many other organic compounds. By changing the reaction conditions in a known manner, these catalysts are also effective for hydrogenating organic compounds in general, and especially fatty glycerides and olefins. They may also be employed in the hydrogenolysis of nitrobenzene to aniline and similar chemical changes. Another utilization lies in the dehydroxylation or demethylation, or both, of cresylic acid-type compounds. Among the substances which can be isomerized with these catalysts, paraffins and naphthenes are the most significant feeds from a commercial standpoint; but polyalkyl aromatics may be similarly treated, as exemplified in the catalytic transformation of o-xylene to p-xylene. In addition to the more common cracking reactions, the contact materials of the present invention are especially suitable for cracking in the presence of hydrogen as in the hydroforming process in which the feed is customarily a low octane naphtha. In hydroforming, a substantial degree of sulfur removal occurs and the reaction may readily be shifted to favor hydrodesulfurization rather than reforming by changing the reaction conditions in a manner familiar to those skilled in the art. The synthesis of hydrocarbons from carbon monoxide and hydrogen in the presence of the contact materials is also contemplated. In the field of oxidative reactions, numerous changes can be effected with the present catalysts including, for example, the transformation of sulfur dioxide to sulfur trioxide, the formation of nitric acid and also of hydrazine from ammonia, the conversion of urea into hydrazine and the oxidation of hydrocarbons in general. An example of a catalytic dechlorination reaction of current importance, which may be catalyzed, is that in which hydrogen converts trifluorotrichloroethane into trifluorochloroethylene and hydrogen chloride. The contact materials of the present invention are also suitable for the hydrogen exchange systems as exemplified by the hydrogenation of coal with decalin and tetralin. By reason of their aromatizing and cyclizing characteristics they are outstanding in preparing benzene, toluene and the like in substantial yields from paraffins and naphthenes and also for the production of more highly cyclized compounds such as naphthalene, anthracene and alkyl substituted derivatives thereof under suitable conditions. In addition, polymerization and alkylation reactions are responsive to these catalysts; for example, the polymerization of olefins and the alkylation of aromatic compounds.

The present process is especially useful for the reforming or hydroforming of naphthas into gasoline stocks of improved antiknock characteristics. Many benefits result from hydroforming with our catalysts in comparison with other known reforming catalysts, including those containing platinum. After partial deactivation due to the deposition of carbonaceous matter during hydroforming, the contact materials disclosed herein have been regenerated several times by combustion in an oxygen-containing gas with substantially full restoration of activity. This adaptability to regeneration is extremely important as it permits a broad variety of feed stocks to be processed successfully, including those of substantial olefin or sulfur content and/or having end points considerably in excess of 400° F. This is not believed to be true of the presently used platinum-reforming catalysts which appear to be non-regeneratable and are brought to require a carefully prepared feed stock of low olefin and sulfur content and having a final boiling point well below 400° F. and to be limited to rather mild hydroforming conditions in order to minimize the formation of deactivating deposits in the contact material in the conversion reaction. No such concern over the feed to the catalysts of the present invention is necessary, as carbonaceous and sulfur-containing substances are readily removed during the regeneration operation. Moreover, severe hydroforming conditions may be freely used as required in the production of higher anti-knock fuels.

The process of the present invention is particularly adapted for hydroforming naphtha stocks. In hydroforming naphtha or gasoline stocks with the catalyst disclosed herein, the conditions may be varied rather widely; thus temperatures of about 600 to about 1050° F. are suitable and the preferred range is from about 800 to about 950° F. Within these temperature limits, weight space velocities of about 0.05 to about 10.0 pounds of naphtha per hour per pound of catalyst in the reaction zone may be employed advantageously; however, space velocities of about 0.25 to about 5.0 provide the best results. Hydrogen should be introduced into the hydroforming reactor at rates running from about 0.5 to about 20.0 mols of hydrogen per mol of hydrocarbon reactants. This hydrogen may be in admixture with light gaseous hydrocarbons. In fact, it is usually introduced by recycling the normally gaseous products, chiefly hydrogen along with about 10% more or less of 1 to 3 carbon hydrocarbons, of the hydroforming reaction. The hydrogen serves an important function in maintaining the activity of the contact material by minimizing coke deposition thereof. While the total reaction pressure may be maintained at any value between about 50 and 1000 pounds per square inch gauge (p. s. i. g.), the best results are obtained by holding the reaction pressure within the range between about 100 and 750 p. s. i. g. In any event, the hydrogen pressure should not be allowed to become so great under any given set of reaction conditions that destructive hydrogenation is inaugurated, as this will result in a net consumption rather than a net production of hydrogen in the reaction.

In the preparation of the catalyst used in this invention, promoters and activators can be used to improve the activity of the catalyst beyond what is expected from those procedures widely used heretofore. The activating agents constitute a material selected from the group consisting of mercury, zinc, cadmium and a compound of such metals. The promoting agents are soluble in water to the extent of at least about 0.05% by weight at 70° F., and they are selected from the class consisting of an alcohol and a ketone. These agents will be taken up in greater detail hereinafter.

The platinum or palladium can be distributed on a carrier material by various methods in order to obtain the results of this invention. The preferred method of catalyst preparation is to use a compound of platinum or palladium for admixture with the carrier material in order to obtain uniform distribution of the platinum or palladium compound throughout the carrier material. Thereafter, the compounds by suitable treatment are decomposed leaving or depositing platinum or palladium metal on the carrier material. Generally, for the purposes of this invention, the platinum or palladium can be deposited on the carrier material in any known manner. However, this should not be understood as meaning that all methods are equivalent, because under certain conditions, some methods are more effective or desirable than others. Methods of depositing or distributing the platinum or palladium on the carrier are, for example: (1) the use of an ammine complex of platinum or palladium for incorporation into the carrier material and then decomposing the complex by suitable means; (2) potassium chloroplatinate, etc., is mixed with the carrier material and then the mixture is boiled to deposit the oxide of platinum or palladium on the carrier and thereafter the oxide is decomposed or reduced; (3) chloroplatinic acid or the suitable palladic acid is treated with hydrogen sulfide to produce platinic or palladic sulfide and this sulfide on the carrier material is decomposed; etc. The details of the methods by which the above described catalysts are prepared are known, in some instances, to those skilled in the art, however, where not, the description is given hereinafter.

As previously indicated, the silica constitutes about 0.5 to 15%, preferably about 1 to 10%, based on the total weight of the catalyst. The silica is employed along with another carrier material because small amounts of platinum or palladium are used generally, and the concentration of silica in the ranges specified above provides the unusual effects to be described more fully hereinafter. The carrier materials to be used with silica are, for example, alumina, titania, charcoal, thoria, zirconia, pumice, kieselguhr, fuller's earth, etc. One or more of the auxiliary carrier materials can be used with silica, however, it should be understood that for the conversion of hydrocarbons the combination of silica and alumina is preferred over any other combination.

In the finished catalyst the platinum or palladium can constitute about 0.01 to about 5%, preferably about 0.2 to 2%, based on the total weight of the catalyst. Larger and smaller amounts of catalytic agent can be used, but considerations of cost and performance dictate against such a practice. In another aspect of this invention, the finished catalyst can contain halogen, preferably in the combined form. Improvements in catalysis of hydrocarbon conversion reactions may be obtained by the use of a catalyst containing 0.1 to about 10%, preferably about 0.2 to 8% of halogen, based on the total weight of the catalyst. The halogen can be, for example, fluorine, chlorine, bromine, etc., however, fluorine is preferred because of the excellent results obtained therefrom.

Generally, in the preparation of the catalysts used for this invention, there may be a wide variation in the manner in which the desired constituents are mixed together. The following are generally methods which can be employed:

(1) The auxiliary carrier in the gel or sol form is mixed with a suitable compound of the catalytic agent, i. e., platinum or palladium, then silica in the gel or sol form is added to the mixture which is (a) the untreated or fresh mixture, (b) the dried mixture, or (c) the calcined mixture. Following this step the entire mixture including the silica is dried and calcined.

(2) Silica gel is mixed with the compound of the catalytic agent, then the auxiliary carrier material in the gel or sol form is added to the mixture which is: (a) the untreated or fresh mixture, (b) the dried mixture, or (c) the calcined mixture. Thereafter, the entire mixture is dried and calcined.

(3) The auxiliary carrier material in the gel or sol form is mixed with either (a) a silicon compound, e. g., silicon tetrachloride or (b) first with the silica gel or sol and then a compound of the catalytic agent is added thereto, and the situations (a) and (b) can be an untreated or fresh mixture, a dried mixture or a calcined mixture.

In the above methods of preparation, the calcination step effects the decomposition of the compound of the catalytic agent to metallic platinum or palladium. However, this step can be accomplished by treating the catalyst mixture with hydrogen at an elevated temperature to reduce the compound to a metallic residue on the carrier material or citric acid, hydrazine, etc. can be used as reducing agents to accomplish the same purpose.

For the auxiliary carrier, alumina, which is preferred in a hydrocarbon conversion catalyst, the following are examples of methods of preparation: (1) Silicon tetrachloride and aluminum chloride are mixed together, and concentrated ammonium hydroxide is added for coprecipitating alumina and silica gels. The gel is washed with water and/or ammoniated water to remove chloride ions. To the fresh, dried or calcined mixture of alumina and silica, a compound of the catalytic agent is added, followed by drying and calcination or reduction. Prior to washing the gel mixture the pH may be adjusted to a range of 4 to 11. (2) Sodium silicate may be treated with HCl, $H_2SO_4$, $HNO_3$ or acetic acid to produce silica gel which may be later added to an alumina sol or gel separately made. (3) Ethyl orthosilicate as the mono-, di-, tri- or tetra-ester is treated with one of the acid described in (2) to form a silica gel. (4) Aluminum sulfate is added to either sodium silicate or the alkyl orthosilicate ester of (3) and then the acid of (2) is added to coprecipitate alumina and silica gels. (5) Aluminum metal, mercury, water and an acid, e. g., hydrochloric or formic acid produce alumina gel. (6) Aluminum metal, water, mercury, silicon tetrachloride, and an acid, e. g., formic or hydrochloric acid produce alumina and silica gels. In any of the above methods, it is intended that the alumina gel or sol formed may be mixed with the silica gel or sol formed by any of the methods given and thereafter the fresh, dried or calcined mixture is combined with a compound of the catalytic agent and the mixture dried and calcined or reduced.

To more fully describe the present invention, descriptions will be given of promoting and activating the catalysts of our process including a description of the use of an ammine complex of platinum or palladium in the preparation thereof.

A catalyst preparation which has been found to be particularly adapted to the improvements of the present invention comprises using a platinum or palladium ammine complex as the means of supplying the catalytic agent. The platinum or palladium ammine complex is prepared from ammonia or substituted ammonia compounds, e. g., the ammines and a platinum or palladium compound. The methods for preparing the ammine complexes are readily known by those skilled in the art to involve complexing a platinum or palladium compound, such as a salt, e. g., a halide, nitrate, sulfate, sulfite, nitrite, oxyhalide, etc., with ammonia or substituted ammonia, e. g., alkylamine, alkyldiamine, quinolines, pyridines, hydrazo compounds, hydroxylamines, etc. The platinum or palladium in the complex may have a coordination valence of 4 or 6. The ammine complexes may be soluble in a polar or non-polar solvent which is employed for facilitating the catalyst preparation, or such ammines can be colloidally dispersed in either a polar or non-polar solvent in the required quantities. In either case, the solution or suspension of ammine complex should be employed in quantities which will provide uniform distribution of the complex throughout the entire catalyst mixture in the desired manner. However, it is preferred to employ the water soluble ammine complexes by reason that the compounds result in very effective types of catalysts. Specific examples of complexes which may be suitable for this invention include nitritodihydroxylaminoammineplatinous chloride, nitritoethylenediaminoammineplatinous chloride, nitritopyridinodiammineplatinous chloride, tetrahydrazinoplatinous chloride dihydrazinodiammineplatinous chloride, tripropylenediaminoplatinic chloride, nitritodichloroethylenediaminomethylaminoplatinic chloride, dichloroquatermethylaminoplatinic chloride, dichlorobisethylenediaminoplatinic chloride, chlornitritopyridinotriammineplatinic chloride, tetrahydroxylaminoplatinous chloride, hydroxylaminotriammineplatinous chloride, quatermethylaminoplatinous chloride, bismethylaminodiammineplatinous nitrate, dihydrazinodiammineplatinous chloride, quaterpyridinoplatinous sulfate, bispyridinopalladic chloride, biethylenediaminopalladous chloride, etc.

The relative quantities of the platinum or palladium ammine complex and of the carrier material are determined by the final composition of the catalyst which is desired. Ordinarily, the quantity of metallic platinum or palladium in the final catalysts product range from about 0.01 to about 5% by weight. Therefore, the quantity of platinum or palladium ammine complexes which is combined with the adsorptive carrier material is determined on the basis of the desired quantity of metallic platinum or palladium in the final catalyst composition. Likewise, the amount of adsorptive material will be determined by difference. For most practical purposes, the concentration of platinum and palladium in the catalyst product should be in the range of about 0.1 to 1% by weight of the metal, because the benefits derived from higher quantities of platinum are usually not justified by the cost of the platinum material used in preparing the catalyst.

The ammine complex can be combined with the carrier material in any manner which is described hereinafter. The ammine complex can be mixed with the silica gel or sol and this mixture as a fresh, dried or calcined mass is mixed with the auxiliary carrier material, e. g., alumina in the gel or sol form and then the entire mixture is dried and calcined. Similarly, the ammine complex is first mixed with the auxiliary carrier material, e. g., alumina in the gel or sol form and this mixture as a fresh, dried or calcined mixture is mixed with the silica in the form of a gel or sol. The entire mixture is then dried and calcined. Another alternative is to have a mixture of silica and auxiliary carrier, e. g., alumina, in either the gel or sol form, and this mass as a fresh, dried or calcined mixture is combined with the ammine complex. The entire mixture is then dried and calcined.

After the ammine complex has been thoroughly mixed with the carrier material, which can be in the form of a gel, a dried material, or a calcined material, the mixture is dried and calcined. Usually drying can be accomplished by heating at a temperature not greater than about 400° F., preferably about 200° F. to about 250° F., and for a period of about 15 to 50 hours. Alternatively, the slurry can be dried and calcined in a single operation by being placed in an oven which is maintained at the temperature in the order of at least about 600–700° F. The calcination procedure is important, because the ammine complex is decomposed to metallic platinum or palladium. The decomposition of the ammine complex can take place at a temperature of at least about 400° F. Generally, it is important in the calcination procedure to avoid an excessively high temperature, because there is a tendency for the catalyst to become permanently deactivated. Therefore, it is the general practice to calcine the catalyst mass at a temperature of at least about 600° F. and a temperature up to about 1500° F., for a period from about 2 to 6 hours. However, it is preferred to calcine the mixture of carrier material, and the platinum or palladium ammine complex at a temperature between about 700° and about 1200° F. for about 3 to 6 hours. Calcination appears to be about the best method of reducing an ammine complex. However, it is also contemplated to reduce the complex by passing hydrogen over the dry material at moderately elevated temperatures. Further, the metal may be deposited on the carrier material before drying by the addition of a reducing agent, such as for example, hydrazine or citric acid, to the ammine complex.

The catalyst product prepared in accordance with the above method may be substantially free of combined halogen or it may contain combined halogen in amount of about 0.2 to about 8% by weight of the total product. In obtaining the desired halogen content for a catalyst which is prepared from aluminum chloride, the gel is washed with water or ammoniated water until the halogen content of the wash water is zero or negligible. Thereafter, it is preferred adding halogen in the form of a hydrogen halide, etc., in the desired proportion. Such a technique lends to a more accurate control of the combined halogen in the catalyst product.

The improvements of the present invention can also be realized by using a catalyst which is prepared by the method comprising the decomposition of a compound of the metal selected from the class consisting of platinum and palladium to form a metallic residue on an adsorptive carrier material in the presence of a metal such as mercury, zinc or cadmium or a compound thereof. The salts of mercury, zinc or cadmium, serve as an activating agent in producing a catalyst of substantially greater activity than catalysts which are prepared without the presence of the activating agent. The activating agent may remain in the final catalysts in certain instances, however, preferably it is a volatile material which evaporates or decomposes, either at or below the temperature at which the catalyst is calcined, or at the operating temperature at which the catalyst is maintained under conversion or regeneration conditions.

The activating agent can be used in the form of an organic or inorganic compound of mercury, zinc or cadmium, or mixtures of the foregoing compounds. The inorganic compounds of mercury, zinc or cadmium include the oxides, hydroxides and salts thereof. The inorganic salts of mercury, zinc and cadmium include, for example, the chlorides, chlorates, bromides, nitrates, sulfates, nitrites, sulfides, sulfites, carbonates, bicarbonates, oxychlorides, fluorides, iodides, phosphates, phosphites, etc. Specific examples of inorganic compounds of mercury, zinc and cadmium are mercuric bromide, mercuric chloride, mercuric chloride, mercuric cyanide, mercuric nitrate, zinc bromide, zinc chlorate, zinc hydroxide, zinc nitrate, zinc sulfide, cadmium carbonate, cadmium hydroxide, cadmium cyanide, cadmium iodide, etc.

The organic compounds of mercury, zinc and cadmium which are useful as activating agents include a variety of classes, such as for example, the salts of the aliphatic and aromatic carboxylic acids, the aliphatic and aromatic sulfur salts, as well as the aliphatic and aromatic phosphorus acids, etc. Particularly useful compounds of mercury, zinc and cadmium are the aliphatic carboxylate salts such as those derived from the fatty acids, the carbonic acids, the thiocarbonic acids, etc. Specific examples of activator salts of the aliphatic carboxylic acids are the monobasic types, such as for example, mercurous acetate, mercuric propionate, mercuric butyrate, mercuric valerate, zinc acetate, zinc formate, zinc caproate, cadmium acetate, cadmium propionate, mercury ethyl carbamate, mercury propyl carbamate, zinc butyl carbamate, cadmium pentyl carbamate, mercury ethyl xanthate, zinc propyl xanthate, cadmium butyl xanthate, etc. The aliphatic polycarboxylic acids can also be used. Useful mercury, zinc and cadmium salts of aromatic carboxylic acids can be of the mono- or polybasic type. Examples of such salts are mercuric phthalate, zinc phthalate, mercurous salicylate, zinc salicylate, cadmium salicylate, etc.

It is preferred that the activating agent volatilize from the catalyst mass at or before calcination temperatures. In some instances, the activating agent is not volatilized at such temperatures, consequently the calcination operation may be conducted under sub-atmospheric pressures in order to remove substantially all or completely the activating agent from the catalyst mass. Moreover, it is preferred to employ activating agents which volatilize from the catalyst mass at a temperature not greater than about 1200° F.

Ordinarily, in the preparation of the catalyst, the activating agent can be added to the carrier material prior to the addition of the platinum or palladium compound; or the activating agent can be added to the mixture of carrier and platinum or palladium compound; or the addition of the activating agent can be made to the platinum or palladium compound prior to mixing the carrier therewith. A further modification is to add the activating agent to either of the carrier materials, viz., the silica gel or sol or the sol or gel form of the carrier other than silica prior to mixing the constituents in the order or sequence described above. The quantity of activating agent employed is about 0.01 to about 10.0%, preferably about 0.5 to about 5.0%, based on the weight of the carrier. For example, a mercury compound should be mixed with a carrier such as, for example, alumina gel in such proportions as to produce a mercury to alumina dry weight ratio of about 0.0001 to 0.1 or higher. In this type of a preparation, the action of the activating agent is not completely understood, although it produces an effect on the catalyst which greatly enhances its activity over any catalyst prepared in the same manner with the activating agent omitted. Whatever may be the change in the catalyst resulting from the introduction of the activating agent into the mixture of constituents from which the catalyst is manufactured, it is not necessary that the activating agent remain in the final catalyst product. As a practical matter, it is preferred to employ activating agents which volatilize below about 1000° F. or 1050° F. and which will leave no apparent trace of residue in the finished catalyst.

In the preparation of the activated catalyst, the platinum or palladium is distributed on the carrier by employing initially a compound of a metal which will decompose to form metallic platinum or palladium at calcination temperatures. The desired form of starting material can be prepared by saturating an aqueous solution of chloroplatinic acid or chloropalladic acid with hydrogen sulfide. Other starting materials can be employed, such as for example, platinum ammine complexes, chloroplatinic acid, ammonium and potassium chloroplatinates and chloroplatinites, the corresponding palladium compounds and the like. Those platinum or palladium compounds which are readily decomposable or reducible to metallic platinum or palladium by heating or by the action of reducing agents usually produce the best type of catalyst. The metallic platinum or palladium content of the final catalyst should be from about 0.01 to about 5.0% by weight, preferably about 0.1 to about 1.0%.

The carrier material for the activated catalyst is prepared in essentially the same manner as described generally hereinabove and with regard to the catalyst obtained from platinum or palladium ammine complex compounds. As indicated hereinabove, with respect to the preparation of the platinum or palladium ammine complex type catalyst, the final product may contain less than about 0.1% by weight on a dry basis of combined halogen. On the other hand, it is also contemplated by means of the present invention to obtain a final catalyst having a combined halogen content in the order of up to about 8% by weight.

In the preparation of the catalyst, the activating agent can be used alone or with a promoting agent which will be described more fully hereinafter. The activating and promoting agents can be incorporated into the catalyst mass by the following methods: (1) with the carrier material either before or after drying and/or calcination; (2) with the activating agent described above; (3) with platinum or palladium compound; or (4) the promoting agent can be added to a mixture of any two or more of the components discussed above. After the activating agent, the platinum or palladium compound, the carrier material and with or without the promoting agent have been thoroughly mixed, the mixture is dried and calcined. The drying operation can be conducted at a temperature of not more than about 400° F., preferably about 200° to 250° F. for a period of about 15 to 50 hours. Alternatively, drying can be accomplished by a flash technique which involves introducing a slurry of catalyst mass into an oven which is maintained at an elevated temperature, for example, at least about 600-700° F. After drying the catalyst mass, it is calcined at a temperature of at least about 400° F., however, more usually at a temperature in the range of about 600° to about 1500° F., preferably about 700° to about 1200° F., and for a period of about 2 to 6 hours or more.

The function of the promoting agent is not completely understood, however, the resultant activity of the catalyst material prepared by employing the promoting agent clearly indicates that an improved catalyst is obtained. Generally, the promoting agent includes a variety of classes of compounds, such as for example, primary, secondary and tertiary aliphatic monohydric alcohols, aliphatic dihydric alcohols, aliphatic tri-hydric alcohols, ketones of the aliphatic and aromatic type, aromatic alcohols, etc. The alcohols can be hydroxyl substituted hydrocarbon compounds or they can comprise substituted alcohols in which there are present groups, such as for example, amino, sulfhydryl, nitro, nitroso, halogen, alkoxyalkyl, carboalkoxy, etc. Among the aliphatic alcohols, it is preferred to employ the alkanols containing about 1 to 9 carbon atoms in the molecule. With respect to aliphatic polyhydric alcohols, it is preferred to employ those containing not more than 10 carbon atoms in the molecule. The ketones may comprise the aliphatic or aromatic type, however, it is preferred using the aliphatic ketones, particularly the alkanones containing not more than 4 carbon atoms in the molecule. It is to be noted that in the case of the promoting agents, it is desired that they possess a water solubility of at least about .05% by weight at 70° F.

For the purposes of this specification and the appended claims, it is intended that "water solubility" of the promoting agent will be the minimum solubility mentioned above. Water solubility is important from the standpoint of obtaining uniform distribution of the promoting agent throughout the catalyst mass prior to calcination. The components of the catalyst prior to calcination may be in the form of a slurry or gel which contain sufficient amounts of water to provide for adequate distribution of the promoting agent. It is possible to employ a material having a lower solubility than indicated hereinabove, however, it will be found that less satisfactory results are produced with respect to catalyst activity. It is preferred that the promoting agent is volatilized from the catalyst mass at a temperature of about or below the calcination point. This is desired in order to avoid the deposition of undesirable cracked products on the finished catalyst product. The following are specific examples of promoting agents which are useful for the purposes of the present invention; methanol, ethanol, propanol, butanol, pentanol, hexanol, heptanol, ethylene glycol, propylene glycol, glycerol, acetone, methyl ethyl ketone, methyl propyl ketone, phenols, benzyl alcohol, etc.

Generally, the promoting agent of the present invention is incorporated into the catalyst mass by one of the following methods: (1) it is combined with either or both of the carrier material components prior to mixing with the platinum or palladium compound with or without the activating agent; (2) by mixing the promoting agent with the platinum or palladium compound prior to mixing same with the other components of the catalyst mass; (3) mixing the promoting agent with the activating agent prior to incorporation of same with either the carrier material or the platinum or palladium compound; or (4) mixing the promoting agent with a mixture of the catalyst components prior to the drying or the calcination operation. The amount of promoting agent employed is determined on the basis of the water which is present in the catalyst mass prior to subjecting same to a drying and/or calcination treatment. It is desirable ordinarily to use about 1 to about 50% by weight, preferably about 10 to about 40% by weight of the promoting agent, based on the weight of water which is present in the catalyst mass, prior to subjecting the mass to a drying and/or calcination treatment. It is preferred that the promoting agent be volatilized substantially or completely from the catalyst mass at about the calcination temperature. However, it is included within the scope of this invention to have a small residue from the promoting agent in the final catalyst product.

After mixing the components of the catalyst mass, including the promoting agent of this invention, the mixture is generally subjected to an initial drying operation which is accomplished at a temperature of not more than about 400° F., preferably about 200° to about 250° F., and for a period of about 15 to about 50 hours. During the drying step, when using a low boiling point promoting agent, it is found that a substantial part or all of the promoting agent is vaporized or volatilized from the catalyst mass. Beneficial effects in catalyst activity are obtained even though the promoting agent is substantially all or completely removed from the catalyst mass as a relatively low temperature, such as during the drying operation. In other cases, where the promoting agent is less volatile, it remains in the catalyst mass for a longer period of time and usually until the calcination temperature is reached. It is not essential that the promoting agent be removed completely from the catalyst mass at the time of reaching calcination temperatures. It is also contemplated that part of the promoting agent be removed during the calcination operation, although it is preferred that substantially all of this agent is removed from the catalyst mass at the time of reaching the calcination temperature. This is desirable in order to avoid any undesirable effects from cracking the promoting agent at elevated temperatures.

Calcination is an important step in the method of producing the promoted catalyst because in this operation, the platinum or palladium compound is decomposed to metallic platinum or palladium on the carrier material. The conditions of calcination are important from the standpoint that all of the platinum or palladium compound should be decomposed to metallic platinum or palladium and the metal should be distributed throughout the carrier material in a way which will produce the greatest catalytic activity. Generally, calcination is conducted at a temperature greater than about 400° F., more usually in the range of about 600° to about 1500° F., preferably about 700° to about 1200° F. The catalyst mass is held at the elevated temperature for a period of about 2 to about 6 hours or more; whereas in the preferred temperature range the mass is calcined for about 3 to about 6 hours.

The following are examples of preparations of catalysts which were used for the purpose of comparison and evaluation to show the effect of silica on cracking in a hydroforming operation.

EXAMPLE I 5210 grams of $AlCl_3 \cdot 6H_2O$ were dissolved in 16 liters of water and mixed with 4 liters of concentrated ammonium hydroxide whereupon alumina gel was precipitated. The catalyst mass was stirred continuously while the gel was being prepared. To the agitated gel was added 1 liter of water to facilitate stirring. 150 ml. of ammonia and 1 liter of water were added further to adjust the pH to 7.30 at 27° C. and the mass stirred for an additional ½ hour. After filtering this mass, the filter cakes were washed to remove chlorine compounds by reslurrying in 16 liters of water for 1 hour. The pH of the slurry was 6.4 at 24° C. In the second wash, the gel was slurried in 14 liters of water and 140 ml. of concentrated ammonium hydroxide. The pH of this was 8.0 at 28° C. After six more similar washings the filtrate showed a positive test for chlorine. For the ninth wash, the gel was slurried in 14 liters of water and 70 ml. of concentrated ammonium hydroxide. It was necessary to re-slurry the gel in 14 liters of water again and the filtrate gave a negative chloride test. The alumina gel was divided into two equal portions. A portion of the alumina gel containing 528 grams of anhydrous alumina, was slurried in 2 liters of water and peptized with 58 cc. of 1:1 acetic acid (diluted with water) and stirred for 1 hour. The pH of the peptized slurry was 4.6 at 22° C.

The platinum ammine complex was prepared by dissolving 4.10 gm. of platinous chloride in 450 cc. of warm concentrated ammonium hydroxide. Thereafter, about 5 ml. of glacial acetic acid was added to the mixture to obtain a total volume of 400 cc. The ammine complex thus prepared was added to the peptized alumina and the mixture stirred for 1 hour. The slurry was dried for 65 hours at 230° F. in a porcelain dish in a small oven. The dried mass was then calcined for two hours at 1000° F. The calcined mass was then ground to −20 mesh, and the resultant mass weighed 535 grams. The catalyst was then pelleted into 3/16" pills using 2% by weight of aluminum stearate. After pelleting the catalyst, the pellets were calcined at 1000° F. for an additional 4 hours. The catalyst pellets were gray in color, speckled with black and had a platinum content of 0.46%. 550 cc. of pellets were charged to the reactor of the experimental unit.

EXAMPLE II 5682 grams of $AlCl_3 \cdot 6H_2O$ were dissolved in 20 liters of water (equivalent to 1200 grams $Al_2O_3$). While stirring vigorously, 46 cc. of $SiCl_4$ (24 grams $SiO_2$) were added to the aluminum chloride solution and immediately followed by 4400 cc. of concentrated ammonium hydroxide, whereupon the alumina-silica gel was precipitated. 55 cc. of concentrated ammonium hydroxide was added to the gel to adjust the pH to 7.04 at 25° C. After filtering this mass, the filter cakes were washed to remove chlorine by reslurrying for ¾ hour in 16 liters of water and 160 cc. of concentrated ammonium hydroxide. In like manner the gel was slurried six more times, each for a period of 1 hour. The eighth wash was the same as those preceeding it except that the amount of added ammonium hydroxide was decreased to 80 cc. During the ninth wash the amount of added ammonia was further reduced to 40 cc. and the time of slurrying reduced to ¾ hour. This procedure was repeated until the thirteenth wash in which the amount of water used was increased to 22 liters and no ammonia was added. A trace chloride test was obtained from the filtrate of the last wash.

The alumina was reslurried and the slurry divided. 5940 grams of the slurry were peptized with 32.2 cc. of glacial acetic acid diluted 1:1 with water to correspond to 0.1 mol of acetic acid per mol of alumina.

A solution of 292 cc. of $Pt(NH_3)Cl_2$ containing 0.01027 gram platinum per cc. was diluted to 400 cc. and added dropwise to the peptized slurry. After stirring for one hour the pH of the slurry was observed to be 5.0 at 30° C. The slurry was then dried for 66 hours at 240° F. in porcelain dishes in a small oven.

The dried catalyst was white with some surface discoloration which was brownish to black. The dish in the bottom part of the oven showed some Pt black on its surface. The solid was then ground to a powder and calcined for 6 hours at 1000° F. The 600 grams of the resulting material were pelleted into 3/16" pills, which were light grey and contained black specks throughout, containing 0.48% Pt and 1.93% $SiO_2$.

EXAMPLE III

In preparing catalyst III, alumina gel is formed by adding 4400 ml. of C. P. concentrated ammonium hydroxide (28% $NH_3$ by weight) with stirring to a solution of 5682 grams of aluminum chloride hexahydrate in 18 liters of water. To facilitate the stirring which was continued for 45 minutes, 2 additional liters of water were used. The resulting slurry had a pH value of 6.98 at 28.5° C. Filtration required a little less than 2 hours. The alumina filter cake was then mixed for 45 minutes in 16 liters of dilute ammonium hydroxide (0.28% $NH_3$ by weight), thereby forming a slurry with a pH of 7.93 at 21.5° C. After again filtering off the liquid over a period of 2½ hours, the alumina was washed in the same manner 6 more times. In the seventh wash slurry the pH had increased to 10.20 at 22.5° C. Two succeeding washes of the same volume followed in which the ammonia concentration was halved and the pH of the ninth wash slurry was 10.46. In a tenth wash the ammonia content was again halved and the pH of the slurry was determined to be 10.30. A final wash was made with 16 liters of water alone to yield a slurry with a pH of 10.04, and only a faint trace of chloride ions was found in the filtrate. Upon slurrying this washed alumina in 3 liters of water for 30 minutes, analysis showed 13.10 weight percent or a total of 1135 grams of $Al_2O_3$ in the mixture. 63.9 ml. of glacial acetic acid, equivalent to 0.1 mol of acid per mol of alumina, was mixed with an equal amount of water and used to peptize the slurry by reducing the pH thereto to 4.5. This changed the thick viscous gel to a water-thin sol. A solution of 18.05 grams of C. P. mercuric acetate in 100 ml. of water and 3 ml. of glacial acetic acid was added to one-half of the peptized alumina slurry. After agitating for 15 minutes, the pH of the slurry was found to be 4.16 at 24° C. A brownish-black sulfurized platinum-containing slurry was prepared by saturating 400 ml. of a solution containing 8 gram of chloroplatinic acid hexahydrate with hydrogen sulfide for 30 minutes. Upon thorouhgly stirring the platinum sulfide slurry into the mixture of mercury salt and peptized alumina, a final pH of 4.8 was obtained at 25.5° C. The resulting pale cream-yellow slurry, which bore a thick layer of foam, was transferred to a large porcelain evaporating dish and dried in an unventilated electric oven for 65 hours at 240° F. While the main body of the dried catalyst was tan in color, a ⅛" thick layer of grey solid was observed in the bottom of the dish. The dried mass was ground in a coffee mill, calcined at 1000° F. for 3 hours and found to weigh 584 grams. The catalyst without additives was then pelleted into 3/16" pills and calcined for another 3 hours at 1000° F. The finished pellets were gray in color and slightly speckled with black. Gravimetric analysis of a 5 gram sample indicated that the finished catalyst contained 0.46% platinum and was free of mercury.

EXAMPLE IV

In another modification of the invention, catalyst IV containing metallic platnium dispersed on a gel carrier consisting of alumina gel with a very small proportion of silica gel therein was prepared. 2841 grams of aluminum chloride hexahydrate (equivalent to 600 grams of $Al_2O_3$) were dissolved in 10 liters of water along with 23 ml. of silicon tetrachloride (equivalent to 12 grams of $SiO_2$). After precipitating with 2228 ml. of concentrated ammonium hydroxide (28% $NH_3$), the slurry was stirred for 1 hour. At this time the pH was 7.04 at 25° C.; then the alumina-silica gel was filtered and washed 12 times with slightly ammoniacal water in the manner described in Example I until the filtrate gave an almost negative chloride test. Water alone was employed in the 13th and final wash. The precipitate was slurried in 1½ liters of water and small samples withdrawn for analysis. The $Al_2O_3$ content of the slurry was 9.57%. Next, the slurry was peptized with a total of 40 ml. of glacial acetic acid in 40 ml. of water, using high speed stirring, thereby bringing the pH to —4.53 at 26° C. After stirring the pure white slurry for ½ hour, a solution of 19 grams of C. P. mercuric acetate (equivalent to 2 percent Hg based on the $Al_2O_3$) in 100 ml. of water and 3 ml. of glacial acetic acid was introduced. No color change occurred at this point and the pH was 4.31 at 25° C. after stirring for 30 minutes. Meanwhile, a sulfurized platnium-containing suspension was prepared by dissolving 8 grams of chloroplatinic acid hexahydrate in sufficient water to make 400 ml. of the solution; then the solution was saturated by bubbling hydrogen sulfide through for about 30 minutes. The resulting brownish-black suspension was added to the peptized alumina slurry and changed the color of the slurry from white to yellowish brown. It appeared that this addition formed a brown precipitate in the slurry, but the obscuring color of the platinum-containing suspension precluded a positive statement on this point. After stirring the mixture for about 45 minutes the pH was found to be 4.28 at 26° C. Next, the slurry was dried in two porcelain evaporating dishes for 21 hours in an unventilated oven at 230–240° F. Then the incompletely dried solids were mixed together in one of the dishes and dried for 24 more hours. It was observed that a dark-gray spongy material had settled to the bottom. The dried mass was ground in a coffee mill, calcined for about 6 hours at 1000° F. and formed into pellets which had a faintly speckled, light gray appearance. Analysis indicated that the finished catalyst contained 0.45 percent platinum and 1.89 percent $SiO_2$, but was free of mercury.

The following data illustrate the superiority of catalysts prepared in accordance with the present invention. The experimental data were obtained by hydroforming petroleum naphtha stock.

The catalysts of the above examples were tested by hydroforming a midcontinent heavy naphtha having an initial boiling point of 230° F. and an end point of 428° F. This naphtha had an octane number (CFRM) of 30 and contained approximately 9% aromatics by volume. By reason of its relatively low naphthenic content and the high end point, this is regarded as a difficult hydroforming stock with a tendency to form relatively large coke deposits. The catalysts were tested on a laboratory scale using a fixed bed of approximately 475 grams of pelleted catalysts. The hydrogen was fed in a pure state at the rates indicated (S. C. F. B.) in the table, measured as standard cubic feet per barrel of oil feed (measured at 60° F. and 760 mm. mercury). The regeneration of the catalyst was conducted by purging the catalyst with hydrogen after the catalyst became partially deactivated by the accumulation of carbonaceous deposits. The pressure of the system was released and then purged with nitrogen. The catalyst was then heated to 950° F. and air was introduced along with nitrogen. The concentration of air was regulated to produce a maximum temperature of 1050° F. in the catalyst bed. During this operation the temperature at various points in the bed was ascertained with two thermo-couples, one located in the upper part, and one in the lower part of the bed. The flow of nitrogen and air through the bed was continued for about ½ hour after the temperature dropped to about 950° F. Following another nitrogen purge, the system was again placed under hydrogen pressure for about 1 hour while the hydrogen rate and temperature was being adjusted before feeding the naphtha again.

The experimental data obtained by the above procedure is presented in Table I below.

thereof, but that the scope of this invention is defined by the following claims. This application is a continuation-in-part of application Serial No. 242,032, filed August 15, 1951, now U. S. Patent No. 2,743,215, and application Serial No. 242,031, filed August 15, 1951, and which is now U. S. Patent No. 2,662,861.

We claim:

1. A reforming process which comprises subjecting a naphtha fraction to contact with a reforming catalyst under suitable reforming conditions, the catalyst is prepared by the method consisting essentially of combining a compound of a metal selected from the group consisting of platinum and palladium, a silicon compound in an amount to provide a finished catalyst containing about 0.5 to about 15% by weight of silica, and an auxiliary carrier material, and treating the resultant mixture to obtain a metal selected from the group consisting of platinum and palladium supported on silica and the auxiliary carrier material.

2. A hydrocarbon conversion process which comprises subjecting a hydrocarbon reactant to contact with a catalyst under suitable conversion conditions, the catalyst is prepared by the method consisting essentially of combining a compound of a metal selected from the group consisting of platinum and palladium, a silicon compound in an amount to provide a finished catalyst containing about 0.5 to about 15% by weight of silica, an auxiliary carrier material and a water soluble promoting agent selected from the class consisting of an alcohol and a ketone, and treating the resultant mixture to obtain a residue of a metal selected from the group consisting of platinum and palladium supported on silica and the auxiliary carrier material.

*Table I*

| Test No. | 1 | 2 | 3 | 4 | 5 | 6 | 7 | 8 | 9 |
|---|---|---|---|---|---|---|---|---|---|
| Catalyst | Ex. I | Ex. II | Ex. II | Ex. III | Ex. III | Ex. IV | Ex. IV | Ex. IV | Ex. IV |
| Temperature, °F | 875 | 897 | 901 | 895 | 906 | 898 | 895 | 895 | 886 |
| Pressure, p. s. i. | 500 | 500 | 500 | 500 | 250 | 500 | 500 | 500 | 500 |
| W₀/hr./W₀ | 1.03 | 1.06 | 1.04 | 3.14 | 3.07 | 2.07 | 3.06 | 2.08 | 2.97 |
| Hydrogen Rate, S. C. F. B. | 4,600 | 5,000 | 4,728 | 4,860 | 4,950 | 4,760 | 4,590 | 4,880 | 4,862 |
| Length of Run—Hrs. | 8 | 8 | 8 | 8 | 8 | 8 | 8 | 8 | 8 |
| No. of Regenerations | 1 | 0 | 1 | 9 | 3 | 0 | 1 | 2 | 3 |
| Yields, Vol. Percent (Output Basis): | | | | | | | | | |
| C₄ free gasoline | 80.9 | 83.5 | 82.3 | 78.1 | 77.9 | 80.7 | 81.4 | 78.2 | 82.8 |
| 100 Percent C₄ gasoline | 86.7 | 88.6 | 87.5 | 85.9 | 86.2 | 86.3 | 86.9 | 86.2 | 87.8 |
| 10# RVP gasoline | 90.0 | 93.9 | 92.9 | 87.8 | 86.8 | 90.0 | 91.0 | 87.2 | 92.6 |
| Carbon—Wt. Percent | 0.1 | .048 | .028 | .09 | 0.05 | .023 | .006 | .016 | .013 |
| Dry Gas—Wt. Percent | 9.6 | 6.7 | 7.3 | 9.5 | 8.0 | 8.8 | 7.8 | 9.5 | 7.3 |
| Excess C₄ for 10# RVP gasoline, Vol. Percent | −3.3 | −5.3 | −5.4 | −1.9 | −0.6 | −3.7 | −4.1 | −1.0 | −4.8 |
| Feed Cracked, Vol. Percent | 38.5 | 29.4 | 33.3 | 39.4 | 26.2 | 34.3 | 31.5 | 40.8 | 35.0 |

Test 1 involves the use of a catalyst which does not contain silica, and it was prepared in the same manner as the catalysts used in Tests 2 and 3 which do contain silica. Upon comparing Test 1 with Tests 2 and 3, it is noted that the dry gas yield and carbon yield are significantly higher and these phenomena are directly attributable to the absence of silica in the catalyst. The dry gas yield is the prime factor in measuring the amount of cracking which takes place in a hydroforming operation, and to a lesser extent the carbon yield also serves as an indication. The catalysts for all runs in this comparison were prepared by using an ammine complex.

Similarly, Tests 4 and 5 which utilized a catalyst void of silica are to be compared with Tests 6–9 inclusive, which involved a catalyst containing silica. The catalyst in Tests 4–9 inclusive, were prepared by the use of an activating agent, e. g., mercuric acetate. A comparison of those runs in which a catalyst free of silica was used with those runs utilizing a silica-containing catalyst clearly indicates that the former catalyst produces significantly higher dry gas and carbon yields.

Having thus described our invention by reference to specific illustrations, it should be understood that no undue limitations or restrictions are to be imposed by reason

3. A hydrocarbon conversion process which comprises subjecting a hydrocarbon reactant to contact with a catalyst under suitable conversion conditions, the catalyst is prepared by the method which consists essentially of combining a compound of a metal selected from the group consisting of platinum and palladium, a silicon compound in an amount to provide a finished catalyst containing about 0.5 to about 15% by weight of silica, and an auxiliary carrier material, and heating the resultant mixture at an elevated temperature for a period sufficient to obtain a residue of a metal selected from the group consisting of platinum and palladium supported on silica and the auxiliary carrier material.

4. The process of claim 3 wherein the catalyst is further characterized by containing combined halogen.

5. A hydrocarbon conversion process which comprises subjecting a hydrocarbon reactant to contact with a catalyst under suitable conversion conditions, the catalyst is prepared by the method which consists essentially of combining an ammine complex of a metal selected from the group consisting of platinum and palladium, a silicon compound in an amount to provide a finished catalyst containing about 0.5 to about 15% by weight of silica, and an auxiliary carrier material, and heating the resultant mixture at an elevated temperature for a period sufficient to obtain a metal selected from the group consisting of platinum and palladium supported on silica and the auxiliary carrier material.

6. A hydrocarbon conversion process which comprises subjecting a hydrocarbon reactant to contact with a catalyst under suitable conversion conditions, the catalyst is prepared by the method which consists essentially of combining a compound of a metal selected from the group consisting of platinum and palladium, a silicon compound in an amount to provide a finished catalyst containing about 0.5 to about 15% by weight of silica, an activating agent selected from the class consisting of mercury, zinc, cadmium and a compound of such metals, and an auxiliary carrier material, and heating the resultant mixture at an elevated temperature for a period sufficient to obtain a residue of a metal selected from the group consisting of platinum and palladium supported on silica and the auxiliary carrier material.

7. A reforming process which comprises subjecting a naphtha fraction under suitable reforming conditions, to contact with a catalyst selected from the group consisting of (a) one prepared by the method consisting essentially of combining an ammine complex of a metal selected from the group consisting of platinum and palladium, a silicon compound in an amount to provide a finished catalyst containing about 0.5 to about 15% by weight of silica, and an auxiliary carrier material, and heating the resultant mixture at an elevated temperature for a period sufficient to obtain a residue of a metal selected from the group consisting of platinum and palladium supported on silica and the auxiliary carrier material, and (b) one prepared by the method which consists essentially of combining a compound of a metal selected from the group consisting of platinum and palladium, a silicon compound in an amount to provide a finished catalyst containing about 0.5 to about 15% by weight of silica, an activating agent selected from the group consisting of mercury, zinc, cadmium and a compound of such metals, and an auxiliary carrier material, and heating the resultant mixture at an elevated temperature and for a period sufficient to obtain a residue of a metal selected from the group consisting of platinum and palladium supported on silica and the auxiliary carrier material.

8. A reforming process which comprises subjecting a naphtha fraction at a temperature of about 800° to about 950° F., a weight space velocity of about 0.25 to about 5.0, a pressure of about 50 to about 1000 p. s. i. g., in the presence of added hydrogen in the amount of about 0.5 to about 20 mols per mol of naphtha, to contact with a catalyst prepared by the method consisting essentially of combining platinum sulfide, an organic compound of mercury, an alumina material and a silicon compound in an amount to provide a finished catalyst containing about 0.5 to about 15% by weight of silica, and heating the resultant mixture at a temperature of about 600° to about 1500° F. for a period sufficient to obtain a residue of platinum supported on silica and alumina.

9. The process of claim 8 wherein the organic compound of mercury is mercuric acetate.

10. A reforming process which comprises subjecting a naphtha fraction at a temperature of about 800° to about 950° F., a weight space velocity of about 0.25 to about 5.0, a pressure of about 50 to about 1000 p. s. i. g., and in the presence of added hydrogen in an amount of about 0.5 to about 20 mols per mol of naphtha, to contact with a catalyst prepared by the method consisting essentially of combining an ammine complex of platinum, an alumina material, and a silicon compound in an amount to provide a finished catalyst containing about 0.5 to about 15% by weight of silica and heating the resultant mixture to a temperature of about 600° to about 1500° F., for a period sufficient to obtain a residue of platinum supported on silica and alumina.

11. A reforming process which comprises subjecting a naphtha fraction at a temperature of about 800° to about 950° F., a weight space velocity of about 0.25 to about 5.0, a pressure of about 50 to about 1000 p. s. i. g., and in the presence of added hydrogen in an amount of about 0.5 to about 20 mols per mol of naphtha, to contact with a catalyst prepared by the method which consists essentially of precipitating alumina and silica gels by the addition of ammonium hydroxide to a mixture of aluminum chloride and silicon tetrachloride, the quantity of silicon tetrachloride employed being sufficient to provide a finished catalyst containing about 1.93% of silica by weight, washing the gels with an ammoniacal solution to remove substantially all of the chloride ions, combining the washed gels with platinous ammine chloride in a quantity sufficient to provide a finished catalyst containing about 0.1 to about 1% by weight of platinum, and heating the resultant mixture at a temperature of 700° to about 1200° F. and for a period of about 3 to about 6 hours to obtain a residue of platinum on silica and alumina.

12. A reforming process which comprises subjecting a naphtha fraction at a temperature of about 800° to about 950° F., a weight space velocity of about 0.25 to about 5.0, a pressure of about 50 to about 1000 p. s. i. g., and in the presence of added hydrogen in an amount of about 0.5 to about 20 mols per mol of naphtha, to contact with a catalyst prepared by the method which consists essentially of precipitating alumina and silica gels by the addition of ammonium hydroxide to a mixture of aluminum chloride and silicon tetrachloride, the amount of silicon tetrachloride employed is sufficient to provide a finished catalyst containing about 1.89% silica, washing the gels with an ammoniacal solution to remove substantially all of the chloride ions, combining the washed gels with mercuric acetate and platinum sulfide, the platinum sulfide being added in an amount sufficient to provide a finished catalyst containing about 0.1 to about 1% by weight of platinum, and heating the resultant mixture at a temperature of about 700° to about 1200° F. for a period of about 2 to about 6 hours to obtain a residue of platinum supported on silica and alumina.

References Cited in the file of this patent

UNITED STATES PATENTS

| | | |
|---|---|---|
| 1,925,820 | Reyerson | Sept. 5, 1933 |
| 2,437,532 | Huffman | Mar. 9, 1948 |
| 2,479,110 | Haensel | Aug. 16, 1949 |
| 2,486,361 | Nahin et al. | Oct. 25, 1949 |
| 2,550,531 | Ciapetta | Apr. 24, 1951 |
| 2,611,736 | Haensel | Sept. 23, 1952 |

FOREIGN PATENTS

| | | |
|---|---|---|
| 343,285 | Great Britain | Feb. 19, 1931 |